Patented Aug. 6, 1940

2,210,594

UNITED STATES PATENT OFFICE 2,210,594

INSECTICIDE AND METHOD OF PRODUCING SAME

John E. Morrow, East St. Louis, Ill., assignor to Aluminum Company of America, Pittsburgh, Pa., a corporation of Pennsylvania No Drawing. Application January 6, 1938, Serial No. 183,683

11 Claims. (Cl. 23—88)

This invention relates to the production of double fluorides of sodium and aluminum, and particularly to the production of a sodium aluminum fluoride having improved properties for use as an insecticide.

Double fluorides of sodium and aluminum occur in nature as the minerals cryolite ($Na_3AlF_6$) and chiolite, the formula of which is reported to be $5NaF.3AlF_3$. The ratio of sodium fluoride to aluminum fluoride in the synthetic compound of this invention approximates that of cryolite ($Na_3AlF_6$), but under some conditions of production may contain those fluorides in somewhat different ratios. Consequently, although my compound might well be called synthetic or artificial cryolite, I prefer to describe it by the general term, sodium aluminum fluoride, which term includes all impurities which may be associated with the compound.

Double fluorides of sodium and aluminum, such as natural and synthetic cryolite, have been used as insecticides, and the usefulness of such compounds as stomach poisons for various insects has been established. It has been demonstrated, for example, that these fluorides are particularly useful in combating the codling moth and the Mexican bean beetle.

Suitable toxicity to insects is necessarily an essential of any insecticide, but this property alone does not determine the usefulness of any particular material for this purpose. The density of a water-insoluble insecticide is a property which is also of prime importance. If the insecticide is to serve satisfactorily for either spraying or dusting, and give proper coverage, the bulk density should not be less than about 65 cubic inches per pound. An equally important property of an insecticide is its adherence, or the property of the insecticide to remain upon the treated vegetable, fruit, foliage, or other surface, when subjected to adverse conditions such as rain, wind, and the like. Insecticides generally are characterized by relatively low adherence, and it is common practice to supplement this property by the addition of a suitable adhesive material such as a fish, vegetable or mineral oil. This practice increases the cost of the insecticide mixtures themselves and may increase the grower's expense for residue removal. It is desirable, therefore, that the insecticide have sufficient adherence in itself to permit its economical use. Furthermore, the property of suspendibility of a water-insoluble insecticide in liquids contributes to its commercial usefulness. Unless the suspendibility of the insecticide is relatively high, expensive equipment will be required to maintain its aqueous suspension in constant agitation and prevent its settling, in order to successfully use the insecticide in a spraying mixture.

It is an object of this invention to provide a sodium aluminum fluoride which is suitable for insect control by spraying or dusting, and which has a suitable combination of the properties of bulk density, adherence, and suspendibility to render its use commercially desirable. It is more particularly the purpose of this invention to provide a sodium aluminum fluoride possessing a combination of the properties of low bulk density, good adherence, and high suspendibility. It is a further object of this invention to provide an economical process for the production of sodium aluminum fluoride possessing this combination of properties.

I have found that sodium aluminum fluoride of substantially uniform fine particle size having a combination of the properties of high bulk density, adherence, and suspendibility in liquids, which renders it particularly useful as an insecticide, may be obtained by precipitation of sodium aluminum fluoride from solution in a two-stage process; in which in the first stage, by rapid precipitation, there is produced sodium aluminum fluoride having a particle size less than that required to obtain the desired properties in the product for insecticidal use, and in the second stage, additional sodium aluminum fluoride is precipitated more slowly, in the presence of the previously precipitated, finely divided sodium aluminum fluoride.

As will hereinafter be more fully explained, the sodium aluminum fluoride of this invention may contain varying amounts of inert compounds, the identity and quantities of which will depend upon the solution or suspension from which the product is precipitated.

The property of bulk density by which the sodium aluminum fluoride of my invention will hereinafter be identified was determined by means of the standard apparatus known in the art as the calcium arsenate density tester, designed by B. R. Coad and S. T. Howard for use by the United States Department of Agriculture, Bureau of Entomology.

In determining the property of adherence of my insecticide, the following test has been used:

Four new 2"x3" microscopic slides were cleaned in a hot solution of sodium silicate, rinsed in water, dried at 110° C., and weighed. The slides were then mounted on pegs on a vertically positioned board, out of contact with the board. Each slide was sprayed with a slurry of the sodium aluminum fluoride, prepared by adding 4.5 grams of this material to 50 cubic centimeters of distilled water at room temperature, shaking vigorously, and permitting it to stand or age for one hour before using. The spray wet the entire surface of the slide and left a residue after drying at 110° C. weighing from 0.005 to 0.01 gram. Each slide was then subjected to the action of a spray of water simulating falling rain for a period of one minute, in which the surface of the slide was subjected to the washing action of approximately 1300 cubic centimeters of water. After drying, the slide was weighed and the percentage of the sodium aluminum fluoride film removed from the surface by the spray was calculated.

The property of suspendibility in water of the sodium aluminum fluoride of my invention was determined by placing two grams of the material in 500 cubic centimeters of water in a 500 cubic centimeter graduated cylinder, agitating the graduate to obtain a uniform suspension, and allowing it to stand exactly 5 minutes. The upper half of the suspension was then siphoned off and the suspended matter filtered out and weighed. The percentage of suspendibility was calculated from this weight.

For the sodium aluminum fluoride of this invention to be suitable for use in either a dusting or spraying insecticide mixture, I have determined that its bulk density should be at least about 75 cubic inches per pound. A bulk density in excess of about 120 cubic inches per pound can be obtained; however, the particle size is then so small that the material, when used for dusting, will not settle properly upon the vegetation being treated. I have found that the best grade of my sodium aluminum fluoride for dusting is that having a bulk density of between 90 and 100 cubic inches per pound.

My invention, however, includes not only a sodium aluminum fluoride of previously unattained bulk density, but also one having accompanying properties of adherence and suspendibility hitherto unknown in such a fluoride, regardless of the previously attained bulk density. In my product having a bulk density of between 75 and 120 cubic inches per pound, I have attained adherence ranging from about 60 to about 80 per cent. In the preferred range of bulk density; that is to say, from 90 to 100 cubic inches per pound, the accompanying adherence is generally about 73 per cent. This association of properties provides a product suitable for both dusting and spraying. By the use of an adhesive, the adherence of my sodium aluminum fluoride insecticides can be increased to any point desired.

The sodium aluminum fluoride of this invention is further characterized by high suspendibility, a property of particular advantage in the preparation and use of spraying mixtures. My double fluoride, having a bulk density of about 75 to 120 cubic inches per pound, has a suspendibility of about 50 to 72 per cent in water, and the preferred product, namely, that having a bulk density of 90 to 100 cubic inches per pound, has a suspendibility of at least about 65 per cent. When this product is added to water, the resultant mixture appears to be almost a transparent solution and possesses properties resembling those of a colloidal mixture; consequently its use does not require constant agitation.

I have discovered that I can produce the sodium aluminum fluoride of this invention by precipitation from a caustic solution containing sodium, aluminum, and fluorine compounds. In the development of a commercially practicable process I have found that numerous factors affect the properties of the product. Density, adherence and suspendibility, I have learned, are determined principally by the temperature and the rate of precipitation; that is to say, the lower the temperature of precipitation and the faster the rate thereof, the less dense will be the product and the greater will be its adherence and suspendibility. In a commercial process, cooling or refrigeration of the solution below the point necessary to gain the desired product is to be avoided for economic reasons, and I have found that although precipitation in the herein described manner can be carried out as low as about 27° F., precipitation within a range of about 60° F. to 70° F. provides the desired product under easily attained operating conditions. I have further found that suspendibility is adversely affected by drying the precipitate in excess of 200° F., and that grinding or excessive rubbing of the particles of the dried precipitate should be avoided to prevent a densifying effect. The adherence also seems to be improved by keeping the drying temperature below 200° F., which may be due to the presence of a small amount of free aluminum hydrate.

The liquor or solution from which sodium aluminum fluoride is to be precipitated can be prepared in numerous ways. For instance, the process can be started with a solution of cryolite in dilute caustic soda, or a solution of sodium aluminate and sodium fluoride. Although the manner of preparing the solution forms no part of this invention, I wish to point out that one economical manner of preparing the liquor is to digest impure cryolite-bearing mixtures, such as carbonaceous wastes containing cryolite and sodium fluoride, in sodium aluminate such as the spent plant liquor resulting from production of alumina by the Bayer process. A typical carbonaceous waste containing sodium fluoride and usually some occluded cryolite is the discarded linings of electrolytic cells used in the production of aluminum by the Hall process, from which more or less of the carbon may have been removed by burning. If the liquor is produced by digestion of such material, the digested slurry may be filtered upon completion of digestion to remove all the insoluble constituents. The liquor, however it is prepared, should be cooled to a temperature of not over about 70° F., and preferably to a temperature of between 60° F. and 65° F. before precipitation.

I have found, however, that regardless of the manner of preparing the liquor, the alumina content thereof should be in excess of that necessary theoretically to combine with the fluorine content to produce sodium aluminum fluoride. This excess seems to have a beneficial effect upon the adherence and density of the product; that is to say, such an excess, the other factors of the process remaining unchanged, seems to make the product less dense than would otherwise be the case. The excess should preferably, however, be not great enough to reduce the sodium aluminum fluoride content of the final product below about 85 per cent.

The prepared liquor may be treated with any acidic material which can be introduced fast enough to neutralize the caustic in the liquor at a suitable rate and thus rapidly precipitate the constituents rendered insoluble. For instance, sulfuric, sulfurous, hydrochloric and other mineral acids, sulfur dioxide, sodium bicarbonate or carbon dioxide may be used. In order to gain economically a sufficiently rapid rate of precipitation, I prefer to neutralize the caustic solution by means of both carbon dioxide and sodium bicarbonate.

In the precipitation stages of the process, a known volume of liquor or starting solution, which for convenience will hereinafter be called green liquor, is placed in a suitable container and is treated with carbon dioxide. When the liquor has reached the point of incipient precipitation, there is added to it an approximately equal volume of liquor which contains sufficient sodium bicarbonate to approximately neutralize the caustic of the green liquor. This added liquor will hereinafter be called mother liquor since it is secured by filtration of a preceding batch. The mother liquor immediately causes a precipitation of the insoluble constituents of the green liquor in a particle size too fine to filter. Thereupon a volume of green liquor equal to the first volume of green liquor is added and the treatment with carbon dioxide, which has been continuous during these steps, is continued until most or all of the normal sodium carbonate of the entire mixture is transformed into sodium bicarbonate, by which time the precipitation of the entire mixture will have been completed. The liquor containing in solution the sodium bicarbonate thus formed, after filtration through a suitable filter press, provides the mother liquor for the process; consequently, this phase of the process is cyclical. The final product has a normal particle size greater than that of the precipitate of the first volume of green liquor, instead of only an increase in average particle size such as one would expect if the final precipitate was a mere mixture of particles of many varying sizes; in other words, the slower rate of precipitation of the added green liquor not only results in the precipitation, at this stage, of particles of larger size than those precipitated from the first volume of green liquor, but also seems to increase the particle size of the first precipitate.

The entire process will be better understood by reference to a specific example. Green liquor was prepared by charging into a digester 2800 pounds of burned carbonaceous pot lining (containing approximately 23.8 per cent soluble sodium fluoride and 10.6 per cent cryolite), 721 gallons of spent plant liquor containing 0.24 pound alumina per gallon, 0.82 pound sodium hydroxide per gallon, 0.76 pound sodium carbonate per gallon, and 4518 gallons of water. After digestion for 16 hours at approximately 75° F., the insoluble residue was filtered off. The liquor contained 0.045 pound of alumina per gallon and 0.19 pound fluorine per gallon (as sodium fluoride), this alumina content being 118 per cent of that theoretically required to combine as cryolite with the fluorine present. The green liquor was cooled to approximately 65° F. and divided into two equal volumes. Through one volume of green liquor lime kiln gas containing 20 per cent carbon dioxide was bubbled until the point of incipient precipitation was reached, at which point an approximately equal volume of mother liquor containing sufficient sodium bicarbonate to neutralize the sodium hydroxide of the green liquor was added with agitation over a period of about 3 minutes. This produced a precipitate too fine to filter and disintegrate. To the mixture was then added the second volume of green liquor over a period of about ½ hour, the treatment with lime kiln gas, which was continuous throughout the process of precipitation, being carried on until the sodium carbonate of the mixture was transformed into sodium bicarbonate. The entire period of treatment with lime kiln gas required approximately 8 hours from the initial treatment of the green liquor until complete carbonation of the mixture. The precipitate was then filtered, washed, and dried at a temperature not exceeding 200° F. After drying, the precipitate, which was then in an agglomerated state, was broken up in a disintegrator consisting of two sets of circularly arranged spokes revolving in opposite directions. The product was found to contain fluorine equivalent to 85.9 per cent sodium alumina fluoride and to have the following physical properties:

| | |
|---|---|
| Density _____ cu. in. per lb. | 100 |
| Adherence _____ per cent | 73 |
| Suspendibility _____ do | 65 |

The foregoing description has dealt with the production of an insecticide which contains substantially 85 per cent sodium aluminum fluoride, but the process is adaptable to the production of sodium aluminum fluoride insecticides of lower fluorine content or of the type in which the active insecticidal material appears on the surface of a relatively inert material for the purpose of economy of the active ingredient. Naturally, insecticides of this latter type differ considerably in their physical properties from the previously described type, but in general the toxicity of the material remains substantially the same, as generally the outer layers of material on each particle of the insecticide seem to be the active insecticidal agents.

If in the foregoing description of the production of the sodium aluminum fluoride insecticide of my invention from the carbonaceous waste, which is the discarded carbon linings of electrolytic cells used in the production of alumina by the Hall process, the inert materials, largely carbon, are not filtered subsequent to the digestion process, I may produce an insecticide of this latter type having improved characteristics as to suspendibility, adherence and bulk density. As an example of the production of this type of material, I prefer to grind the discarded pot linings to a fineness such that 80 to 90 per cent will pass through a 200-mesh screen, and subject this material to the process previously described but omitting the filtration of the solution from the digestor. The sodium aluminum fluoride content of this latter described material should be sufficient to coat each carbon particle with a more or less complete and uniform layer over its surface.

As a specific example of the production of insecticides of this latter type, I ground 19.5 pounds of discarded pot linings in a ball mill until 89 per cent passed a 200-mesh screen. An analysis of the ground product showed that it contained:

| | Per cent |
|---|---|
| NaF | 39.63 |
| $Na_2CO_3$ | 20.4 |
| NaOH | 1.3 |
| Insolubles | Remainder |

The above ground pot lining was added to a solution comprising 7 gallons of spent plant liquor and 39 gallons of water. The spent plant liquor had the following analysis:

| | Lb./gal. |
|---|---|
| $Al_2O_3$ | 0.218 |
| NaOH | 0.906 |
| $Na_2CO_3$ | 0.594 |

This slurry was mixed at room temperature for 24 hours, then the temperature was adjusted to 68° F. and, at this temperature, gassed with $CO_2$ until 70 per cent of the total soda in solution had been converted to sodium bicarbonate. The slurry was then filtered, washed, dried in a steam drier, and disintegrated in a disc mill. The resulting product was found to be composed of carbonaceous particles coated with sodium aluminum fluoride, and to have excellent insecticidal properties.

Upon the basis of the foregoing complete description of both the sodium aluminum fluoride product and the process for making it, I claim as my invention:

1. An insecticidal grade of precipitated sodium-aluminum fluoride having a bulk density, as precipitated, of over 75 cubic inches per pound.

2. An insecticidal grade of precipitated sodium-aluminum fluoride having a bulk density, as precipitated, of over 75 cubic inches per pound accompanied by high adherence.

3. An insecticidal grade of precipitated sodium-aluminum fluoride having a bulk density, as precipitated, of about 75 to about 120 cubic inches per pound accompanied by high adherence and high suspendibility.

4. An insecticidal grade of precipitated sodium-aluminum fluoride having a bulk density, as precipitated of over 90 cubic inches per pound accompanied by over 60 per cent adherence.

5. In a process for producing an insecticidal grade of sodium-aluminum fluoride by precipitation from an alkaline solution containing sodium, aluminum, and fluorine compounds, the steps comprising neutralizing the liquor with an acidic material until the point of incipient precipitation is reached, causing rapid precipitation by the addition of a large volume of acidic material, adding a second volume of said alkaline solution without appreciably raising the temperature of the mixture, and completing the precipitation of the mixture to increase the particle size of the previously formed precipitate to the desired degree by the addition of further amounts of acidic material.

6. In a process for producing an insecticidal grade of sodium-aluminum fluoride by precipitation from green liquor, said green liquor containing sodium, aluminum, and fluorine compounds and dilute caustic alkali, the steps comprising neutralizing the liquor with a gaseous acidic material until the point of incipient precipitation is reached, causing rapid precipitation by the addition of a large volume of liquid acidic material, adding a second volume of said green liquor without appreciably raising the temperature of the mixture, and completing the precipitation of the mixture to increase the particle size of the previously formed precipitate to the desired degree by the addition of further amounts of acidic material.

7. In a process for producing an insecticidal grade of sodium-aluminum fluoride by precipitation from green liquor at a temperature below about 220° F., said green liquor containing sodium, aluminum, and fluorine compounds and dilute caustic alkali, the steps comprising neutralizing the liquor with a gaseous acidic material until the point of incipient precipitation is reached, causing rapid precipitation by the addition of a large volume of liquid acidic material, adding a second volume of said green liquor without appreciably raising the temperature of the mixture, and completing the precipitation of the mixture to increase the particle size of the previously formed precipitate to the desired degree by the addition of further amounts of gaseous acidic material.

8. In a process for producing an insecticidal grade of sodium-aluminum fluoride by precipitation from green liquor containing sodium, aluminum, and fluorine compounds and dilute caustic alkali at a temperature below about 220° F., the steps comprising neutralizing the liquor with carbon dioxide until the point of incipient precipitation is reached, causing rapid precipitation by the addition of liquid acidic material, adding a second volume of said green liquor without appreciably raising the temperature of the mixture, and completing the precipitation of the mixture to increase the particle size of the previously formed precipitate to the desired degree by the addition of further amounts of acidic material.

9. In a process for producing an insecticidal grade of sodium-aluminum fluoride by precipitation from green liquor containing sodium, aluminum, and fluorine compounds and dilute caustic alkali, the steps comprising neutralizing the liquor with carbon dioxide until the point of incipient precipitation is reached, causing rapid precipitation by the addition of a volume of mother liquor containing sodium bicarbonate in an amount approximately sufficient to complete neutralization of the green liquor, adding a second volume of said green liquor without appreciably raising the temperature of the mixture, and completing the precipitation of the mixture to increase the particle size of the previously formed precipitate to the desired degree by the addition of further amounts of acidic material.

10. In a process for producing an insecticidal grade of sodium-aluminum fluoride by precipitation from a green liquor at a temperature between about 60° F. and 70° F., said green liquor containing sodium, aluminum, and fluorine compounds and dilute caustic alkali, the steps comprising neutralizing the liquor with carbon dioxide until the point of incipient precipitation is reached, causing rapid precipitation by the addition of a volume of mother liquor containing sodium bicarbonate in an amount approximately sufficient to complete neutralization of the green liquor, adding a second volume of said green liquor without appreciably raising the temperature of the mixture, and completing the precipitation of the mixture to increase the particle size of the previously formed precipitate by the continuous addition of carbon dioxide.

11. In a process for producing an insecticidal grade of sodium-aluminum fluoride by precipitation from green liquor at a temperature below about 220° F., said green liquor containing sodium, aluminum, and fluorine compounds and dilute caustic alkali, the steps comprising neutralizing the liquor with a gaseous acidic material until the point of incipient precipitation is reached, causing rapid precipitation by the addition of a large volume of liquid acidic material, adding a second volume of said green liquor without appreciably raising the temperature of the mixture, completing the precipitation of the mixture to increase the particle size of the previously formed precipitate to the desired degree by the addition of further amounts of gaseous acid material, and drying the final precipitate at a temperature below about 200° F.

JOHN E. MORROW.